United States Patent
Altuev

(10) Patent No.: US 10,635,925 B2
(45) Date of Patent: Apr. 28, 2020

(54) METHOD AND SYSTEM FOR DISPLAY THE DATA FROM THE VIDEO CAMERA

(71) Applicant: OOO ITV Group, Moscow (RU)

(72) Inventor: Murat K. Altuev, Chernogolovka (RU)

(73) Assignee: OOO ITV Group, Moscow (RU)

( * ) Notice: Subject to any disclaimer, the term of this patent is extended or adjusted under 35 U.S.C. 154(b) by 142 days.

(21) Appl. No.: 16/027,230

(22) Filed: Jul. 3, 2018

(65) Prior Publication Data

US 2019/0311212 A1    Oct. 10, 2019

(30) Foreign Application Priority Data

Apr. 10, 2018    (RU) .................... 2017140239

(51) Int. Cl.
| | | |
|---|---|---|
| G06K 9/62 | (2006.01) | |
| G06K 9/46 | (2006.01) | |
| G06T 7/80 | (2017.01) | |
| G06T 7/10 | (2017.01) | |
| G06T 7/70 | (2017.01) | |
| G06K 9/00 | (2006.01) | |

(Continued)

(52) U.S. Cl.
CPC ....... *G06K 9/4633* (2013.01); *G06K 9/00201* (2013.01); *G06K 9/00771* (2013.01); *G06T 7/10* (2017.01); *G06T 7/70* (2017.01); *G06T 7/80* (2017.01); *G08B 13/00* (2013.01); *H04N 7/183* (2013.01); *G06T 2207/10016* (2013.01); *G06T 2207/30232* (2013.01)

(58) Field of Classification Search
CPC .......... G06K 9/00201; G06K 9/00771; G06K 9/4633; G06T 7/10; G06T 7/70; G06T 7/80; G06T 7/183; G06T 2207/30232; G06T 2207/10016; G08B 13/19602; G08B 13/19613; G08B 13/00; G08B 13/19604; H04N 7/183
USPC ....................................... 382/113
See application file for complete search history.

(56) References Cited

U.S. PATENT DOCUMENTS

| | | | | |
|---|---|---|---|---|
| 8,208,686 | B2 * | 6/2012 | Tasaki ....................... | G06T 7/73 382/103 |
| 9,749,594 | B2 * | 8/2017 | Huang .................... | H04N 7/181 |
| 10,110,856 | B2 * | 10/2018 | Rasheed .............. | G06K 9/3241 |

(Continued)

FOREIGN PATENT DOCUMENTS

| | | |
|---|---|---|
| RU | 2417437 C2 | 4/2011 |
| RU | 2012101736 A | 7/2013 |

*Primary Examiner* — Gabriel I Garcia

(74) *Attorney, Agent, or Firm* — IRL Legal Services, LLC; Ilya R. Lapshin

(57) ABSTRACT

A system and method of video surveillance, namely, for processing of graphic and other video information for combination of display of the video images received from video cameras and data submitted a map of a given. The method including receiving an image from the video camera, defining a static object and coordinates of its location on a frame of the image and defining a mobile object and coordinates of its location on an image frame. Then setting a graphic symbol of a static object on map, calibrating the video camera and defining at least four virtual segments on the map and frame of the received image, and transforming coordinates of the static object from system of coordinates of a frame to a system of coordinates of the map, displaying a combination image on a display, and consecutively adjusting the transparency of the combined image.

13 Claims, 4 Drawing Sheets

(51) Int. Cl.
*H04N 7/18* (2006.01)
*G08B 13/00* (2006.01)

(56) References Cited

U.S. PATENT DOCUMENTS

| | | | |
|---|---|---|---|
| 2007/0162942 A1* | 7/2007 | Hamynen | G06T 19/006 |
| | | | 725/105 |
| 2009/0010493 A1* | 1/2009 | Gornick | G06K 9/00771 |
| | | | 382/103 |
| 2009/0238407 A1* | 9/2009 | Tasaki | G06T 7/73 |
| | | | 382/103 |
| 2013/0162838 A1* | 6/2013 | Huang | H04N 7/181 |
| | | | 348/169 |
| 2016/0165193 A1* | 6/2016 | Rasheed | G06K 9/3241 |
| | | | 348/143 |
| 2019/0156495 A1* | 5/2019 | Altuev | H04W 4/33 |

* cited by examiner

METHOD AND SYSTEM FOR DISPLAY THE DATA FROM THE VIDEO CAMERA

RELATED APPLICATIONS

This application claims priority to Russian Patent Application No. RU 2017140239, filed Apr. 10, 2018, which is incorporated herein by reference in its entirety.

FIELD OF THE INVENTION

Technical solution belongs to systems of video surveillance and to computer systems, namely, to processing of graphic and other video information for combination of display of the video images received from at least one video camera and data submitted on the map of any area.

BACKGROUND

Systems of video surveillance are understood as the hardware-software providing or technical means using including methods of computer sight for the automated data collection, on the basis of the analysis of stream video (video analysis). Systems of video surveillance can lean on the algorithms of processing of the image and recognition of images allowing analyzing video without direct participation of the person.

Systems of video surveillance, depending on specific goals, can realize a set of functions, such as: detection of objects, tracking the movement of objects, classification of objects, identification of objects, detection of situations, including disturbing and many other things.

One of tasks which is possible for solving by means of system of video surveillance is fast definition of location of an object.

Map is understood as the map and/or the map of any room and/or a real estate object and/or the area. On the map mobile and static objects which can have on the map the, symbols can be displayed.

The decision opened in the application (RU 2012101736 A, published on Jul. 27, 2013), wherein the method and system of a video location can be used for protection of rooms, cars and other objects. The method of a video location containing the obtaining of the video image by means of, at least, one PTZ video camera, the recording it on the computer which have the "mouse" manipulator and reproduction on the monitor wherein that the image of the protected object in the 3D format is introduced in memories of the computer with coordinates of all elements of the protected object also in memory of the computer coordinates of the PTZ video camera are brought, and the image received from the PTZ video camera is imposed on the image in the 3D format, at the same time the operator installs the manipulator cursor on any point of the protected object, and the computer issues the command for turn of an axis of the PTZ video camera for this point. When using this decision correct display of the video image of objects on map is not supposed.

From the level of the equipment the decision opened in the patent (RU 2417437 C2), wherein the technology directed to display the results of searches of network content on mobile devices which includes obtaining results of request of network content by means of the mobile device is disclosed at the same time is also known receive a geoposition of at least one object connected with results of request of network content. At the same time, in the field of the review of the camera of the mobile device observe a scene and define virtual location, virtual location represents the real location of an object concerning the scene which is contained to the field of the review of the camera, the graphic representation representing an object then display in virtual location in the field of the review of the camera. When using this technology correct display of the video image of objects on map is not supposed.

BRIEF SUMMARY

This technical solution is directed to elimination of the shortcomings inherent in the previous equipment level.

Technical result of the declared group of inventions is increase in accuracy of display of objects on map in system of video surveillance due to transformation of coordinates of location of an object from system of coordinates of a frame in system of coordinates of map.

The yielded technical result is achieved at the expense of the offered method of display the data by, at least, one video camera in system of the video surveillance which is characterized by the fact that:

receive at least one image from the video camera;

define, at least, one static object and coordinates of its location on a frame of the image received from the video camera;

define, at least, one mobile object and coordinates of its location on a frame of the image received from the video camera;

set the graphic symbol of a static object designating a static object on map;

make calibration of the above-stated video camera in the course of which define not less than four virtual segments on the above-mentioned map and a frame of the received image characterizing coordinates of location of a static object in space and carry out a task of links between them, at the same time one end of each segment corresponds to an arrangement of a static object in a frame, other end of a segment corresponds to an object arrangement on map;

will transform coordinates of location of a static object from system of coordinates of a frame to system of coordinates of map, using the links set on the previous step and combine the received image from the video camera with graphic symbol which designates a static object on map;

display the mentioned combined image on the display, at the same time automatic adjustment of transparency of the combined image depending on existence and situation on it mobile objects is carried out.

The yielded technical result is also achieved at the expense of system of video surveillance for display of data by means of, at least, one video camera containing:

at least, one block of data acquisition from the video camera;

at least, one processing device of teams;

at least, one device of data storage;

one or more computer programs loaded into, at least, one above-mentioned device of data storage and one or more computer programs which are carried out on, at least, one above-mentioned processing device of teams, at the same time contain instructions for performance of a method of display the data by, at least, one video camera in system of video surveillance.

The yielded technical result is also achieved at the expense of the machine-readable carrier of data containing the machine-readable instructions executed by one or more processor which at their execution realize performance of a method of display the data by, at least, one video camera in system of video surveillance.

In one private version of the declared decision, set in the course of calibration of link it is possible to edit and/or delete.

In other private version of the declared decision, location of static and/or mobile objects in sight of the video camera can be defined by means of the video analytics which is built in the video server and/or built in the video camera.

In one private option, location of static and/or mobile objects in sight of the video camera is defined by means of the sensors fixing various parts of a range, such as visible, thermal, and/or sensors, excellent by the principle of action from the video camera, such as radars.

In other private option, the location of static and/or mobile objects in sight of the video camera can be visualized for the user by display of video data over map on the monitor screen.

In one private option, map can be two-dimensional.

In other private option, map can be three-dimensional.

In one private option, for three-dimensional map change of an inclination of the plane of the map is possible.

In other private option, automatic and manual scaling and shift perhaps for map.

In one private option, at automatic adjustment of transparency, make transparent all photos, except points where there are mobile objects.

In other private option, as symbols on map video cameras and/or the relay, and/or devices of control systems and/or managements of access, and/or devices of security and fire alarm systems, and/or face recognition posts, and/or numbers of cars can be displayed.

In one private version, a field of vision of the video camera it can be displayed on map in the form of area, excellent on color and/or the transparency from other elements of map and/or limited from other elements of map.

DETAILED DESCRIPTION

Figure 1:
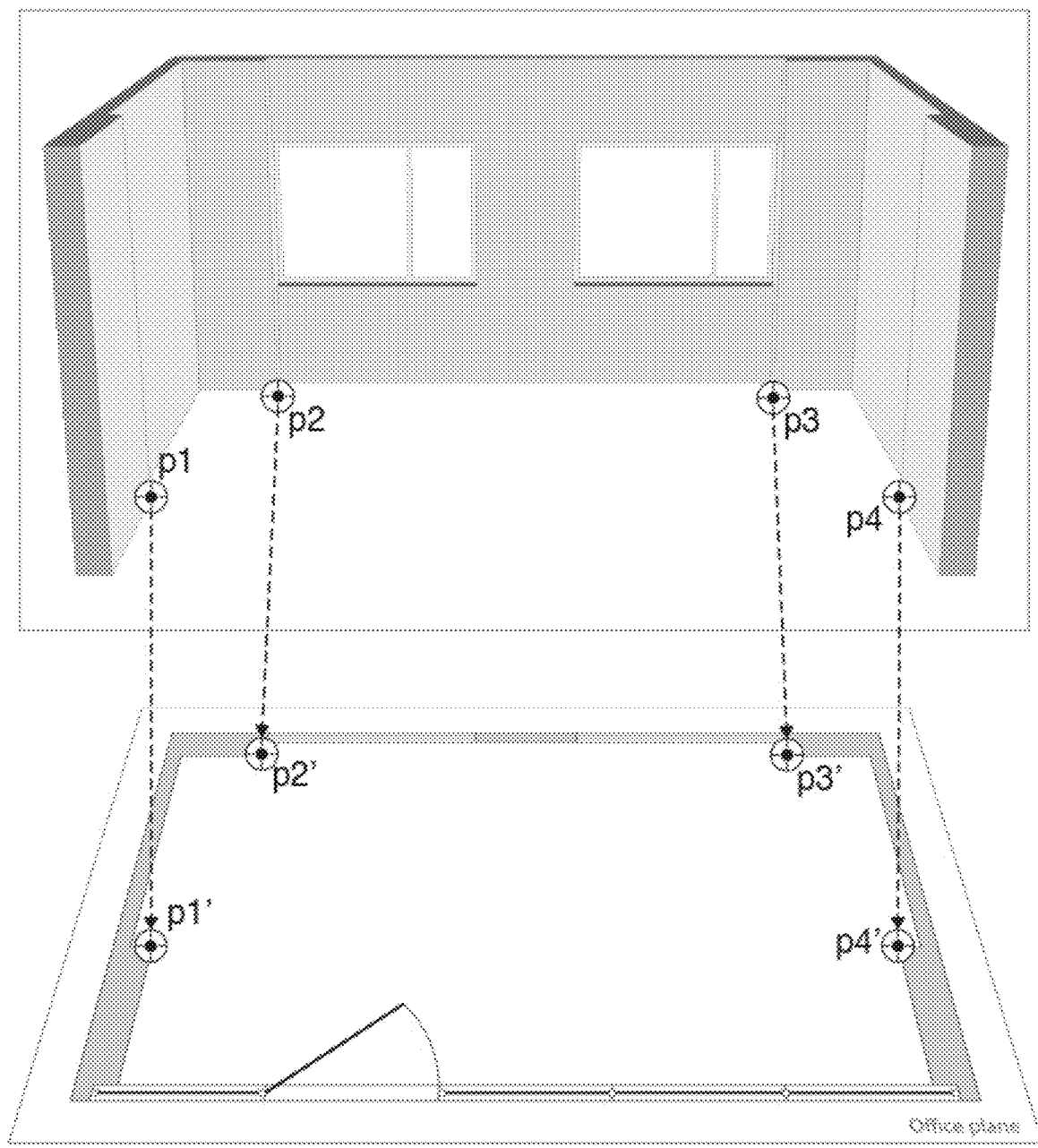
FIG. 1—choice points on the frame of the video image and map characterizing location of an object in space.
Figure 2:
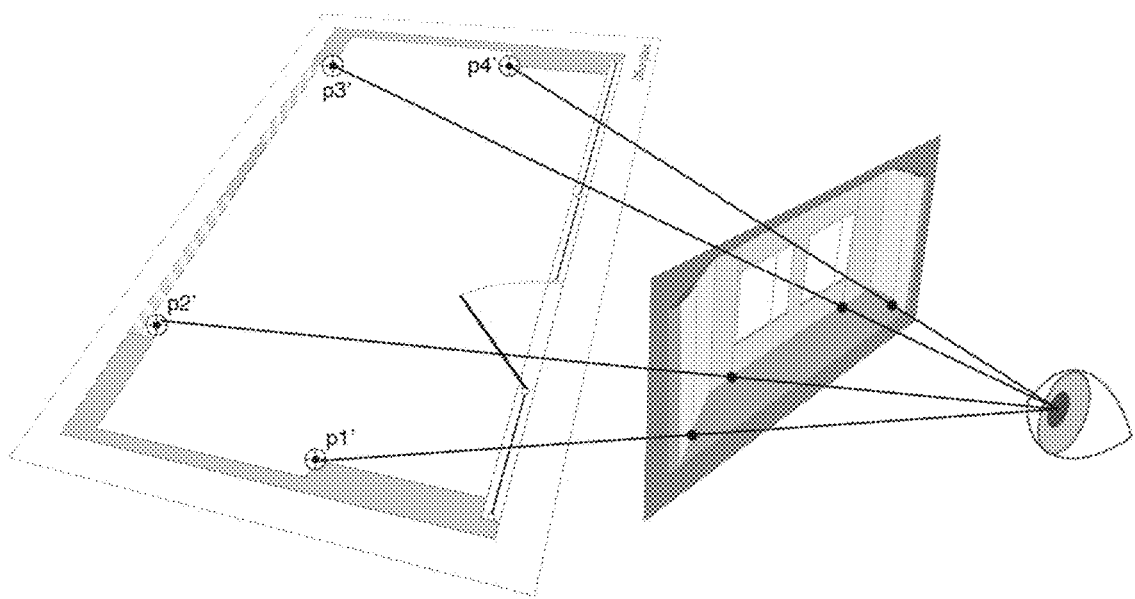
FIG. 2—an example of use of perspective transformation.
Figure 3:
FIG. 3—primer the interface of objects of a binding, the map and video images received from video cameras.

This technical solution in various options of implementation can be executed in the form of the way realized on the computer in the form of system or the machine-readable carrier containing instructions for performance of an above-mentioned way.

In this technical solution the system is meant as the computer system, the COMPUTER (electronic computer), NPC (numerical program control), PLC (programmable logical controller), the computerized control systems and any other devices capable to carry out the set, accurately certain sequence of operations (actions, instructions).

The processing device of teams is meant as the electronic block or the integrated circuit (microprocessor) executing machine instructions (programs).

The processing device of teams reads out and carries out machine instructions (programs) from one or more device of data storage. As the device of data storage can act, but, without being limited, hard drives (HDD), a flash memory, ROM (read-only memory), solid-state stores (SSD), optical drives.

The program—the sequence of the instructions intended for execution by the control unit of the computer or the processing device of teams.

Below some terms which will be used further at the description of this technical solution will be considered.

Calibration of the camera is a problem of obtaining internal and external parameters of the camera of the available photos or videos, finished shooting by it.

Calibration of the camera is often used at the initial stage of the solution of many tasks computer vision and in particular augmented reality. Besides, calibration of the camera helps to correct the distortion in photos and video.

Map (map) is a map of an object of video surveillance which is available to viewing by the video surveillance operator. On map the arrangement of video cameras and other objects is usually specified. Usually map has some interactivity—on it current state of video cameras is displayed, the operator can make any actions.

In the real technical solution, the method of display the data by, at least, one video camera in system of video surveillance wherein offered: receive at least one image from the video camera;

define, at least, one static object and coordinates of its location on a frame of the image received from the video camera;

define, at least, one mobile object and coordinates of its location on a frame of the image received from the video camera;

set the graphic symbol of a static object designating a static object on map;

make calibration of the above-stated video camera in the course of which define not less than four virtual segments on the above-mentioned map and a frame of the received image characterizing coordinates of location of a static object in space and carry out a task of links between them, at the same time one end of each segment corresponds to an arrangement of a static object in a frame, other end of a segment corresponds to an object arrangement on map;

will transform coordinates of location of a static object from system of coordinates of a frame to system of coordinates of map, using the links set on the previous step and combine the received image from the video camera with graphic symbol which designates a static object on map;

display the mentioned combined image on the display, at the same time automatic adjustment of transparency of the combined image depending on existence on it mobile objects is carried out.

It becomes possible thanks to realization of the mode of the immersion on map increasing interactivity of observation. It allows to present the more visually movement of objects in real space. In the immersion mode the translucent video image is displayed together with map, and static objects in a frame (furniture, doors, etc.) are combined with the designations on it. The concrete video camera to a certain map or the site of map becomes attached.

Further stages of the declared way which are implemented also by means of the declared system and the machine-readable carrier will be briefly considered.

Figure 6:
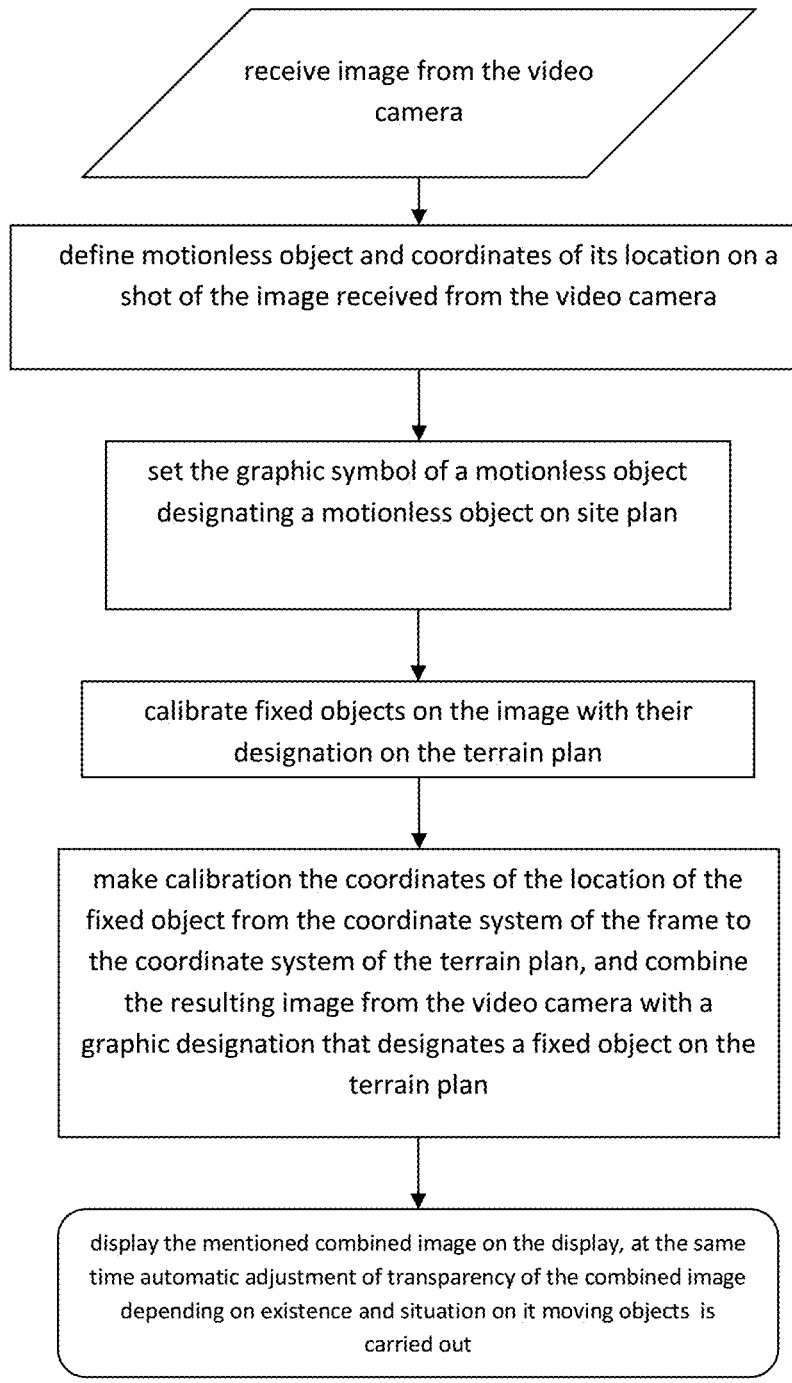
FIG. 6—block-scheme one of options of realization of a method of display the data from the video camera.

On FIG. 6 the flowchart of one of options of realization of a method of display the data from the video camera is shown.

1. Receive, at least, one video image from the video camera.

In some options of realization of technical solution of video cameras can be two and more; video cameras can be installed in more than one room. At the same time for each camera there can correspond the map (that is in any area only one video camera can be installed), or several video cameras are installed in one area and the map of this area with an opportunity to switch between video cameras is used.

2. Define, at least, one static object and coordinates of its location on a frame of the video image received from the video camera.

3. Define, at least, one mobile object and coordinates of its location on a frame of the image received from the video camera.

Various segments of furniture, office and household appliances, and also doors, window sills and other objects having volume and spatial structure can act as static objects.

Such objects as the person, vehicles, animal and many others can act as mobile objects.

In some options of realization of technical solution location of static and/or mobile objects in sight of the video camera can be defined by means of the video analytics which is built in the video server and/or built in the video camera.

In some options of realization of technical solution location of static and/or mobile objects in sight of the video camera is defined by means of the sensors fixing various parts of a range, such as visible, thermal, and/or sensors, excellent by the principle of action from the video camera, such as radars.

In some options of realization of technical solution location of static and/or mobile objects in sight of the video camera, can be visualized for the user by display of video data over map on the monitor screen.

4. Set the graphic symbol of a static object designating a static object on map.

On FIG. 1 the example of the choice of points on the video image and on map is shown.

Map represents the image in a common format, for example, of jpg or png. The map can be loaded into system of video surveillance and to use it as map. Or there is an opportunity to use the realistic maps of the area received for example from the Internet, for example, such as the OpenStreetMap web resource.

In some options of realization of technical solution map with the objects noted on it can be in advance loaded into the device of storage of information. At the same time map can be two-dimensional, three-dimensional.

For three-dimensional map change of an inclination of the plane of the map is possible.

Automatic and manual scaling and shift perhaps for map.

Video cameras and/or the relay, and/or devices of control systems and/or managements of access, and/or devices of security and fire alarm systems, and/or face recognition posts, and/or numbers of cars can be displayed on map as symbols.

The field of vision of the video camera can be displayed on map in the form of area, excellent on color and/or the transparency from other elements of map and/or limited from other elements of map.

5. Make calibration of the above-stated video camera in the course of which define not less than four virtual segments on the above-mentioned map and a frame of the received image characterizing coordinates of location of a static object in space and carry out a task of links between them, at the same time one end of each segment corresponds to an arrangement of a static object in a frame, other end of a segment corresponds to an object arrangement on map.

6. Will transform coordinates of location of a static object from system of coordinates of a frame to system of coordinates of map, using the links set on the previous step and combine the received image from the video camera with graphic symbol which designates a static object on map.

As a rule, for representation 2D-point coordinates on the plane the look vector column $[u\ v1]^T$, and for a situation 3D task—a point in world coordinates is used—$[x_w\ y_w\ z_w\ 1]^T$. It should be noted that these expressions are written down in the expanded notation homogeneous coordinates, which is the most widespread in robotics and problems of transformation of solid bodies. In particular, in model camera obscura the matrix of the camera is used for projection of points of three-dimensional space on the image plane:

$$z_c \begin{bmatrix} u \\ v \\ 1 \end{bmatrix} = A[R\ T] \begin{bmatrix} x_w \\ y_w \\ z_w \\ 1 \end{bmatrix}$$

wherein $z_c$ is any large-scale coefficient.

In the proposed technical solution coincidence of provision of images of objects to their situation on map will be only for those video cameras for which the binding to map is executed (calibration).

It is offered on an entrance set of the corresponding points from the image of the survey camera and to the map to construct such matrixes which will allow to calibrate so the camera that the image from the camera could be combined with the image of objects on the map.

Required matrixes are called a matrix of transfer and a matrix of turn. The matrix of turn has dimension [3×3], and a transfer matrix dimension [3×1].

In order that it was possible to restore unambiguously the above-stated matrixes it is necessary to transfer 4 vapors of corresponding points from the map and the survey camera on which matrixes of turn and transfer will be restored in order that the image from the survey camera was imposed on the map. Couple of corresponding points is understood as one point from the map which coordinates have dimension 3: (x; y; z), and, the point corresponding to it from the survey camera which coordinates have dimension 2: (u; v).

We set 4 couples of points of a binding of video to the map. Couple of points—one point is specified on the map, another is specified on a video image frame. Both points have to specify the provision of the same subject (for example, a room corner). In total it is necessary to set four couples of such points.

At the same time, these 4 couples of points can form not less than 4 virtual segments on the map on which the task of links between a static object and map is carried out.

In this decision there is a binding of static objects (a table, a case, a corner of the building and etc.) on the video image with their designation on map. One end of each segment corresponds to an object arrangement in a frame; other end of a segment corresponds to an object arrangement on map.

The image in the survey camera is formed of a three-dimensional scene by a projection to the image from the camera, using perspective transformation:

$$sm'=A[R|t]M' \qquad (1)$$

or $$s\begin{bmatrix}u\\v\\1\end{bmatrix}=\begin{bmatrix}f_x & 0 & c_x\\0 & f_y & c_y\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}X\\Y\\Z\\1\end{bmatrix},\quad(2)$$

where:
(X; Y; Z)—coordinates in three-dimensional space,
(u; v)—the corresponding coordinates on the image, $$A=\begin{bmatrix}f_x & 0 & c_x\\0 & f_y & c_y\\0 & 0 & 1\end{bmatrix},\quad(3)$$

A is a matrix of the camera or matrix of internal parameters. This matrix can be calculated by an algorithm automatically or to be transferred in quality entrance. In this matrix $f_x$; $f_y$ are focal distances of the camera, $c_x$; $c_y$ are main point of this matrix, $$R=\begin{bmatrix}r_{11} & r_{12} & r_{13}\\r_{21} & r_{22} & r_{23}\\r_{31} & r_{32} & r_{33}\end{bmatrix},\ T=\begin{bmatrix}t_1\\t_2\\t_3\end{bmatrix},\quad(4),(5)$$

the matrixes of turn and transfer, respectively, which are subject to restoration.

At restoration of matrixes R and T arises PnP a full task which is solved in the offered algorithm by means of a Levenberg-Marquardt method, essence in application to this algorithm is the following: to look for function of display of three-dimensional points from the map for two-dimensional points of the image as function with the minimum error of a reprojection or, in other words, function for which the sum of squares of distances from restored to real points of observation is minimum.

7. Display the mentioned combined image on the display, at the same time automatic adjustment of transparency of the combined image depending on existence on it mobile objects is carried out.

One of possible options of use of this technical solution is the immersion mode.

In the mode of immersion, it is possible "to move" between cameras, choosing any camera from the current area of visibility. Thus, it is possible to pass from one camera to another, without leaving the immersion mode that is convenient when it is required to track movement of any object.

In the immersion mode the video image from the chosen video camera is displayed over the image of the map. At the same time on the basis of in advance set binding such foreshortening at which static subjects to observation on the video image and the map will coincide is selected. The operator sees the map and video imposed on it. Often on real objects of video surveillance the image from video cameras same—it can be almost identical rooms (for example, corridors of office building), the identical image of perimeter of an object etc. If in the field of visibility of any camera there is a disturbing situation, it is difficult to operator to define, where exactly this camera is. If cameras are placed on the map and there is an opportunity to quickly watch video "with a binding to the area", then the problem of definition of the real situation of the video camera considerably becomes simpler. Besides, the operator it is possible "to monitor" a disturbing situation in the immersion mode, using several cameras. Example: on one of cameras the mobile person is noticed. The operator passes into the immersion mode on this camera. As it is tied to the map, the operator can define approximately a trajectory of the movement of the person and define in sight of what camera it will appear after an exit from a field of vision of the current camera. Therefore, the operator can directly switch in the mode of immersion to this camera and continue observation.

Figure 4:
FIG. 4—an example of realization of the mode of immersion in work.
Figure 5:
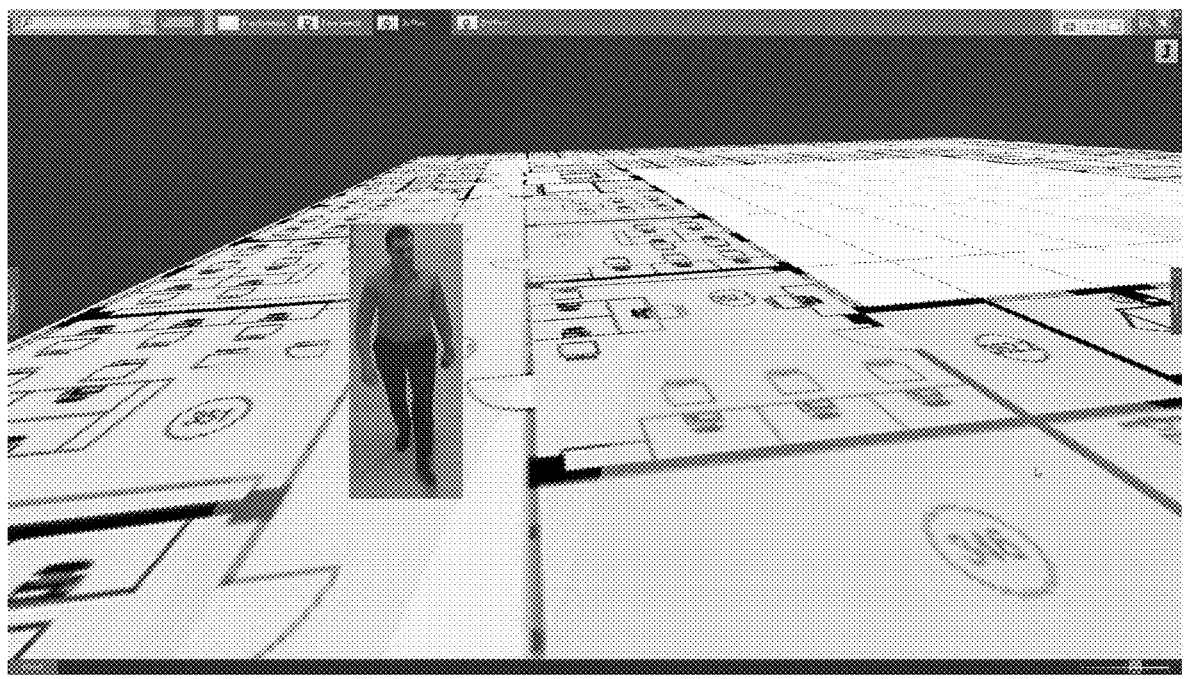
FIG. 5—an example of display of the combined image.

On FIG. 4 and FIG. 5 examples of display of the combined images on which transparency degree is corrected are shown.

At display of the combined image, in the declared decision there is an opportunity to automatically regulate transparency of a frame, i.e. various parts of a frame can be displayed with various degree of transparency.

For example, it is possible to make all photo transparent except those points where there are mobile objects, and the displayed combined image will turn out even more evident.

In system it is possible to change degree of transparency of a mobile object in addition.

For example, if in a point of the image there is a mobile object, the point is shown with transparency 1 if is not present, then with transparency 2.

Options of implementation of the real group of inventions can be realized with use of the software, hardware, program logic or their combination. The program logic, the software or a set of instructions are stored in an example of implementation on one of various traditional machine-readable carriers. In the context of this document any environment or means which may contain, to store, transfer, extend or transport instructions for their use by system of implementation of instructions, the equipment or the device, such as computer can be "the machine-readable carrier". The machine-readable carrier can turn on the non-volatile machine-readable carrier of data which can be any environment or the means containing or storing instructions for their use by system of implementation of instructions, the equipment or the device such as computer, or for use in connection with them.

If it is necessary, at least, a part of various functions considered in this description can be executed in excellent from presented an order and/or at the same time with each other. Besides, if necessary one or more of the functions described above can be optional or can be combined.

Though in independent points of a formula of the invention various aspects of the present invention are characterized, other aspects of the invention include other combinations of signs from the described options of implementation and/or dependent points of a claim of the invention together with signs of independent points of a claim of the invention, at the same time the mentioned combinations are not necessarily obviously specified in an invention claim.

The invention claimed is:

1. A method for displaying data in a video surveillance system comprising the steps of:
   receiving an image frame from a video camera;
   detecting a static object in the frame;
   determining coordinates of the static object in the frame;
   detecting a mobile object in the frame;
   determining coordinates of the mobile object in the frame;
   setting on a map a graphic image designating the static object;
   calibrating the video camera comprising:
     defining four line segments determining coordinates of
       the static object in space, each segment comprising a first end located at the static object in the frame and a second end located at the static object in the map; and defining links between the four line segments;

transforming the coordinates of the static object from frame coordinates to map coordinates using the links;

combining at least a part of the image frame with the graphic image to obtain a combination image;

displaying the combination image on a display; and adjusting transparency of the combination image depending on presence and the coordinates of the mobile object.

2. The method of claim 1, further comprising editing or deleting the links.

3. The method of claim 1, wherein the coordinates of the static object or of the mobile object in the frame is determined by a video processor integrated into a video server or built into the video camera.

4. The method of claim 1, wherein the coordinates of the static object or of the mobile object in the frame are determined by sensors detecting electromagnetic radiation, visible light, or thermal emission, or by radars.

5. The method of claim 1, further comprising displaying the frame on top of the map on a monitor screen to visualize the coordinates of the static object or of the mobile object for a user.

6. The method of claim 1, wherein the map is two-dimensional.

7. The method of claim 1, wherein the map is three-dimensional.

8. The method of claim 7, further comprising changing inclination of a map plane.

9. The method of claim 1, further comprising scaling or shifting the map automatically or manually.

10. The method of claim 1, wherein the adjusting transparency comprises making the image transparent except for a location of the mobile object.

11. The method of claim 1, wherein the map includes a symbol denoting the video camera, or a relay, or a control device, or an access control device, or a fire alarm device, or a face recognition device, or a car license plate recognition device.

12. The method of claim 1, further comprising displaying the frame on the map as an area of a different color or transparency from other parts of the map or separate from elements of the map.

13. A video surveillance system for displaying data from a video camera, comprising:

a unit for receiving data from the video camera;

a command processing unit;

a data storage device;

at least one computer program stored in the data storage device and executed on the command processing unit, wherein the at least one computer program comprises instructions for performing the method of claim 1.

* * * * *